United States Patent [19]

Wu

[11] Patent Number: 5,619,905

[45] Date of Patent: Apr. 15, 1997

[54] APPARATUS FOR WARMING UP WINE

[76] Inventor: Sheng-Yuan Wu, P.O. Box 82-144, Taipei, Taiwan

[21] Appl. No.: 602,306

[22] Filed: Feb. 16, 1996

[51] Int. Cl.⁶ .............................. C12C 13/00; B01F 3/12
[52] U.S. Cl. ........................................ 99/323.3; 126/358
[58] Field of Search ................................. 99/323.3, 275, 99/323.1, 323.2; 126/358, 255, 256

[56] References Cited

U.S. PATENT DOCUMENTS

| | | | |
|---|---|---|---|
| 1,240,389 | 9/1917 | Truhan | 126/358 |
| 3,084,613 | 4/1963 | Maxson | 99/323.3 |
| 4,470,999 | 9/1984 | Carpiae | 99/323.3 |

*Primary Examiner*—Robert W. Jenkins
*Attorney, Agent, or Firm*—Alfred Lei

[57] ABSTRACT

An apparatus for warming up wine, including a receptacle, a spring fixedly secured to the receptacle on the inside, a packing rubber mounted around the top end of the receptacle, a glass container mounted in the receptacle and supported on the packing rubber to hold wine and having a tap for regulating the flow of wine, a cover covered on the glass container and having an air vent for guiding hot air out of the glass container, a heat source holder mounted within the receptacle and supported on the spring, and a heat source mounted in said heat source holder and controlled to heat wine in the glass container.

6 Claims, 3 Drawing Sheets

5,619,905

APPARATUS FOR WARMING UP WINE

BACKGROUND OF THE INVENTION

1. Field of the Invention

This invention relates to an apparatus for warming up wine, which comprises a glass container to hold wine, a receptacle to hold a head source holder and a head source for heating the glass container.

2. Description of the Invention

When drinking a certain kind of wine, people tend to warm it up before drinking in order to obtain a better taste. However, it is dangerous to hold a hot bottle of wine with the hand. Furthermore, when a bottle of wine is warmed up, it will become cold quickly during the winter season.

SUMMARY OF THE INVENTION

This invention relates to an apparatus for warming up wine.

According to one aspect of the present invention, the apparatus comprises a receptacle, a spring fixedly secured to the receptacle on the inside, a packing rubber mounted around the top end of the receptacle, a glass container mounted in the receptacle and supported on the packing rubber to hold wine and having a tap for regulating the flow of wine, a cover covered on the glass container and having an air vent for guiding hot air out of the glass container, a heat source holder mounted within the receptacle and supported on the spring, and a heat source mounted in said heat source holder and controlled to heat wine in the glass container.

According to another aspect of the present invention, the receptacle has two opposite retaining slots for mounting the heat source holder; the heat source holder comprises a center holding chamber, which receives the heat source, a plurality of air vents spaced around the center holding chamber, two horizontal screw rods at two opposite sides in reversed directions respectively extending out of the retaining slots of the receptacle, and two rounded nuts respectively threaded onto the horizontal screw rods to fix the heat source holder in place. By loosening the nuts, the heat source holder can be adjusted to the desired elevation along the retaining slots.

According to still another aspect of the present invention, a glass ornament is sintered to the inside of the glass container which deflects the light of the heat source to produce a lighting effect.

According to still another aspect of the present invention, the glass ornament can be shaped like any of a variety of plants, animals, human characters, instruments, etc.

According to still another aspect of the present invention, the cover has an upright screw rod at the top, a knob threaded onto the upright screw rod, and an air vent for guiding hot air out of the glass container.

According to still another aspect of the present invention, the heat source holder is made from iron; the heat source has a magnet fixedly secured to a bottom side thereof for fastening to the center holding chamber of the heat source holder by magnetic attraction.

According to still another aspect of the present invention, the receptacle has a hollow base detachably fastened to the bottom side thereof by a screw joint.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
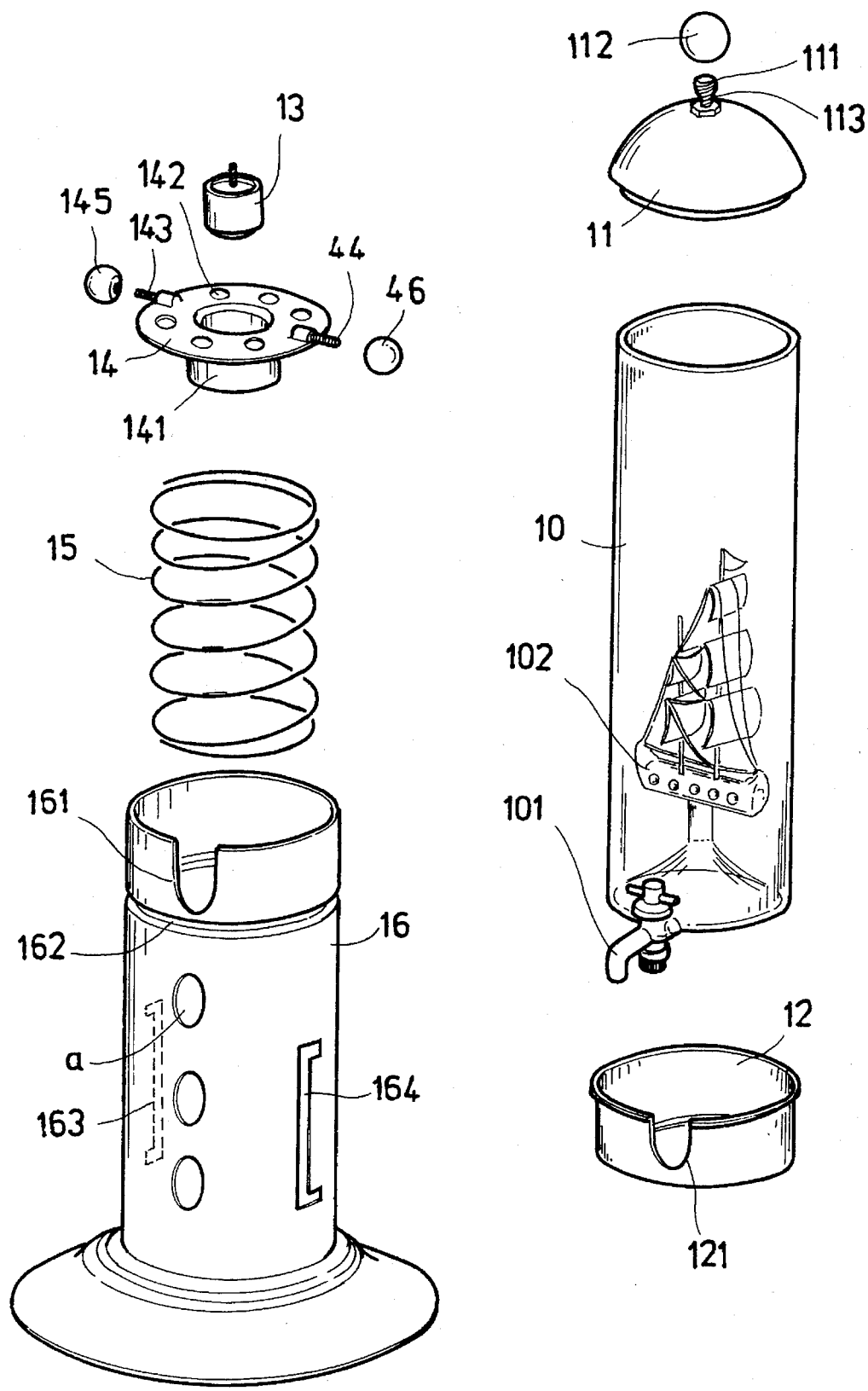
FIG. 1 is an exploded view of the apparatus for warming up wine of the preferred embodiment of the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Referring to FIG. 1, an apparatus for warming up wine in accordance with the present invention is generally comprised of a transparent glass container 10, a cover 11, a cylindrical flanged packing rubber 12, a heat source 13, a heat source holder 14, a spring 15, and a hollow tubular receptacle 16.

Figure 2:
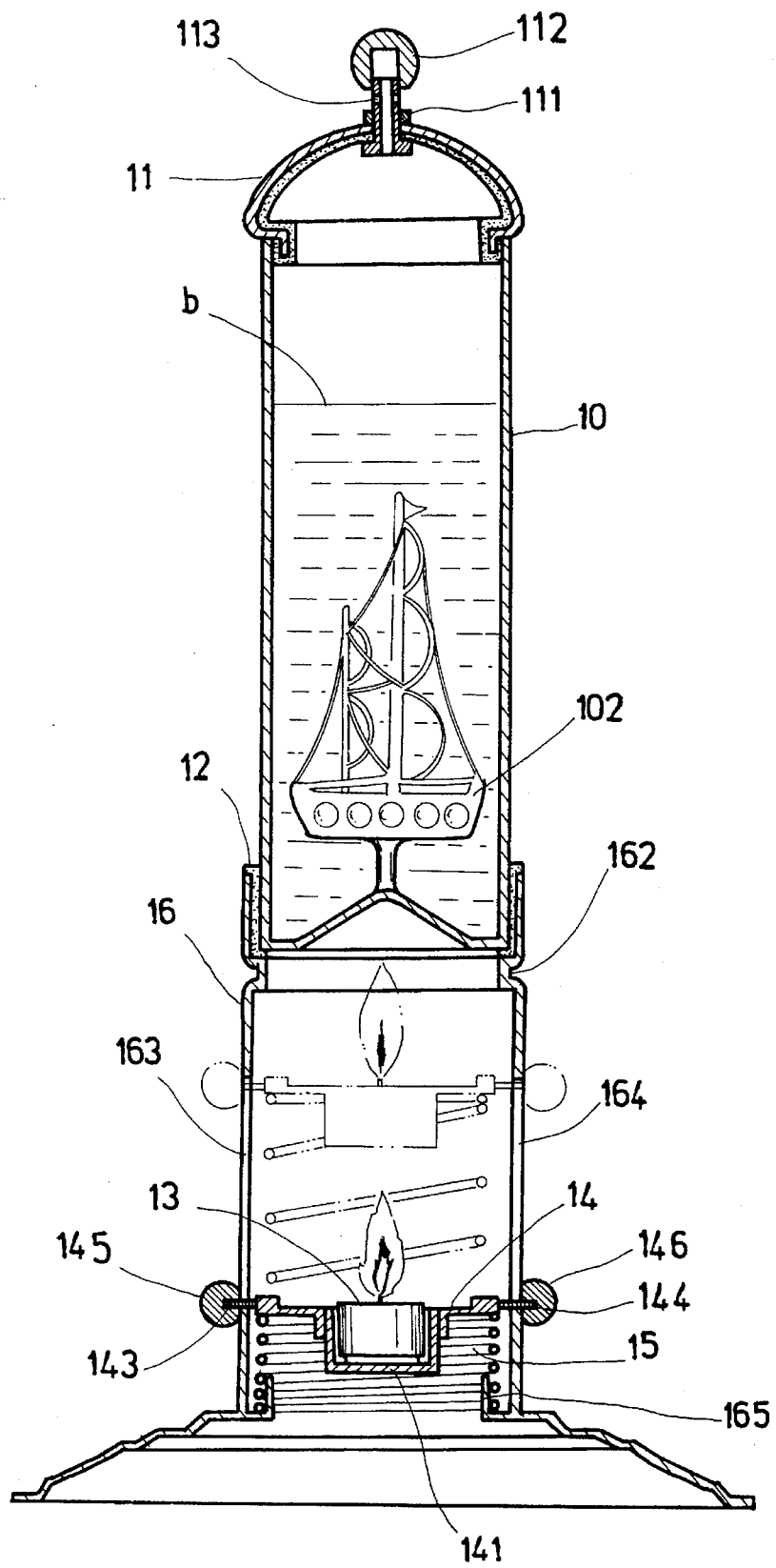
FIG. 2 is a sectional assembly view of the apparatus shown in FIG. 1.

Referring to FIG. 2 and FIG. 1 again, the glass container 10 has a cylindrical shape, a tap 101 at the bottom for regulating the flow of wine from the glass container 10, and a glass ornament for example a glass ship 102 fastened to the inside by a sintering process. The cover 11 is covered on the top open end of the glass container 10, having a hollow upright screw rod 113 at the top, an air vent 113 through the upright screw rod 113, and a knob 112 threaded onto the hollow upright screw rod 113. When the knob 112 is fastened to the upright screw rod 113, it does not stop the air vent 113. The flanged packing rubber 12 is mounted around the top end of the receptacle 16, having a side opening 121 which receives the tap 101 of the glass container 10. The spring 15 is mounted inside the hollow receptacle 16. The heat source 13 can be a kerosene lamp, candle, etc. The heat source holder 14 is mounted inside the hollow receptacle 16 and supported on the spring 15 to hold the heat source 13, comprising a center holding chamber 141, which receives the heat source 13, a plurality of air vents 142 spaced around the center holding chamber 141, two horizontal screw rods 143, 144 at two opposite sides in reversed directions, and two rounded nuts 145, 146 respectively threaded onto the screw rods 143, 144. The hollow tubular receptacle 16 comprises a peripheral top notch 161, an outside annular groove 162 around the periphery adjacent to the top notch 161, a plurality of vertically spaced air vents "a" and two opposite retaining slots 163, 164 through the periphery, and a stepped hollow base 165.

Referring to FIGS. 1 and 2 again, the heat source holder 14 is inserted into the receptacle 16 from the bottom side, permitting the screw rods 143, 144 to be respectively inserted through the retaining slots 163, 164 to the outside of the receptacle 16, then the nuts 145, 146 are respectively threaded onto the screw rods 143, 144 to fix the heat source holder 14 to the receptacle 16, and then the spring 15 is inserted into the receptacle 16 from the bottom side and fixedly secured to the inside of the stepped hollow base 165 to stop against the heat source holder 14, and then the cylindrical packing rubber 12 is mounted around the receptacle 16 at the top and fastened to the outside annular groove 162, and then the heat source 13 is mounted in the center holding chamber 141 of the heat source holder 14, and then the glass container 10 is mounted the receptacle 16 and supported on the cylindrical packing rubber 12 with the tap 101 extending out of the side opening 121 of the cylindrical packing rubber 12 and the top notch 161 of the receptacle 16, and then the cover 11 is covered on the glass container 10.

Figure 3:
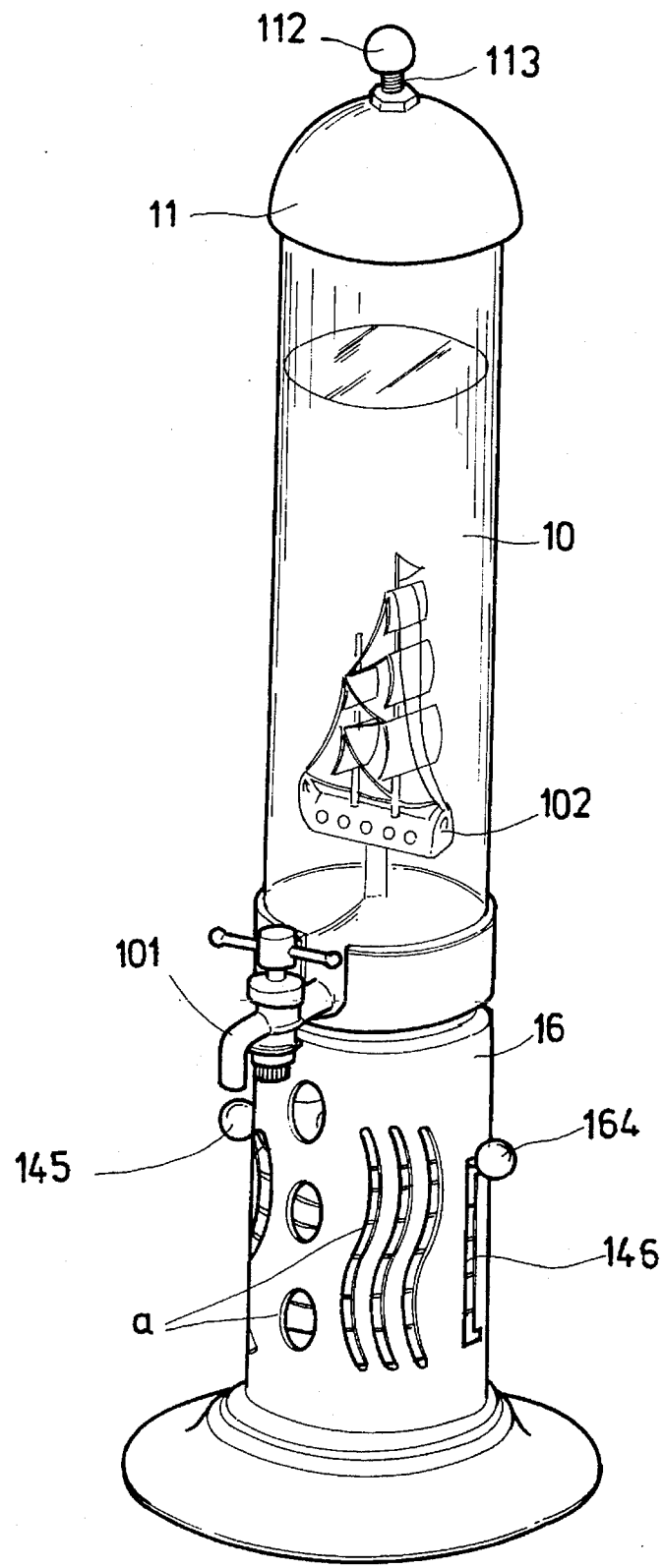
FIG. 3 is a perspective view of FIG. 2.

Referring to FIG. 3 and FIG. 2 again, by loosening the nuts 145, 146, the heat source holder 14 can be adjusted to the desired elevation along the retaining slots 163, 164, and a burning match can be inserted through one air vent "a" to fire the heat source 13. When wine "b" in the glass container 10 is heated, hot air is allowed to escape out of the cover 11 through the air vent 113. Through the tap 101, wine "b" is guided out of the glass container 10 for serving. Furthermore, the glass ornament 102 deflects the light of the flame of the heat source 13 to produce a lighting effect.

While only one embodiment of the present invention has been shown and described, it will be understood that various modifications and changes could be made without departing from the spirit and scope of the invention disclosed. For example, a magnet may be fixedly secured to the heat source at the bottom so that the heat source can be attracted to the heat source holder when it is put in the center holding chamber.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An apparatus for warming up wine, comprising:

a receptacle, said receptacle comprising a peripheral top notch, an outside annular groove around the periphery adjacent to said top notch, a plurality of vertically spaced air vents and two opposite retaining slots through the periphery, and a stepped hollow base;

a spring mounted inside said receptacle and fixed to said stepped hollow base;

a cylindrical packing rubber mounted around said receptacle and fastened to the outside annular groove of said receptacle;

a glass container mounted on said cylindrical packing rubber above said receptacle for holding wine, said glass container having a tap at a bottom end thereof extending out of the side opening of said packing rubber and the top notch of said receptacle for regulating the flow of wine from said glass container;

a cover covered on said glass container, said cover having a hollow upright screw rod at a top side thereof, an air vent through said upright screw rod for guiding hot air out of said glass container, and a knob threaded onto said hollow upright screw rod;

a heat source holder mounted within said receptacle and supported on said spring, said heat source holder comprising a center holding chamber, a plurality of air vents spaced around said center holding chamber, two horizontal screw rods at two opposite sides in reversed directions respectively extending out of the retaining slots of said receptacle, and two rounded nuts respectively threaded onto said horizontal screw rods to fix said heat source holder in place; and a heat source mounted in the center holding chamber of said heat source holder and controlled to heat wine in said glass container.

2. The apparatus as claimed in claim 1, wherein said glass container has a glass ornament on the inside.

3. The apparatus as claimed in claim 1, wherein said cover has an air vent for guiding hot air out of said glass container.

4. The apparatus as claimed in claim 1, wherein the air vent of said cover is made through said upright screw rod.

5. The apparatus as claimed in claim 1, wherein said glass container has a cross section different from that of said receptacle, and a bottom end fitting into said receptacle.

6. The apparatus as claimed in claim 1, wherein said heat source is a candle.

\* \* \* \* \*